(12) United States Patent
Duclos et al.

(10) Patent No.: US 9,067,742 B2
(45) Date of Patent: Jun. 30, 2015

(54) VESSEL GRIPPING MEMBER COMPRISING A REMOVABLE NOSE EQUIPPED WITH A MANDREL AND AN EJECTION PLATE

(71) Applicant: SIDEL PARTICIPATIONS, Octeville sur Mer (FR)

(72) Inventors: Yves-Alban Duclos, Octeville sur Mer (FR); Denis Cardine, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 13/753,710

(22) Filed: Jan. 30, 2013

(65) Prior Publication Data
US 2013/0200642 A1 Aug. 8, 2013

(30) Foreign Application Priority Data
Feb. 8, 2012 (FR) ...................................... 12 51155

(51) Int. Cl.
*B65G 47/90* (2006.01)
*B65G 47/86* (2006.01)
*B23Q 1/00* (2006.01)
*B25J 15/00* (2006.01)
*B29C 49/42* (2006.01)
*B29C 49/06* (2006.01)

(52) U.S. Cl.
CPC ................ *B65G 47/842* (2013.01); *B23Q 1/00* (2013.01); *B25J 15/00* (2013.01); *B29C 49/4205* (2013.01); *Y10T 29/53991* (2015.01); *B29C 49/06* (2013.01)

(58) Field of Classification Search
CPC .......................... B65G 47/842; B29C 49/4205
USPC ....... 294/93, 94, 96, 99.1, 195, 196; 198/867.05, 867.06, 867.09, 803.7, 198/803.8, 803.12
See application file for complete search history.

(56) References Cited

U.S. PATENT DOCUMENTS

| 4,082,175 | A | * | 4/1978 | Gibbemeyer | ............ | 198/377.02 |
| 4,487,568 | A | | 12/1984 | Wiatt et al. | | |
| 4,572,355 | A | * | 2/1986 | Hunter | ..................... | 198/803.12 |
| 4,927,205 | A | * | 5/1990 | Bowler et al. | ................... | 294/94 |
| 6,761,556 | B1 | * | 7/2004 | Pellegatta et al. | ............. | 425/534 |
| 6,811,389 | B1 | | 11/2004 | Guiffant et al. | | |
| 7,008,215 | B2 | * | 3/2006 | Goss | ............................ | 425/534 |
| 7,694,802 | B2 | * | 4/2010 | Lapert | ........................ | 198/470.1 |
| 2013/0015040 | A1 | | 1/2013 | Leroux et al. | | |

FOREIGN PATENT DOCUMENTS

| FR | 2 792 569 | 10/2000 |
| FR | 2 957 904 | 9/2011 |
| WO | 2011/001358 | 1/2011 |

OTHER PUBLICATIONS

French Search Report dated Oct. 4, 2012, corresponding to the Foreign Priority Application No. FR 1251155.

* cited by examiner

*Primary Examiner* — Dean Kramer
(74) *Attorney, Agent, or Firm* — Young & Thompson

(57) ABSTRACT

A member (22) for gripping vessels (16) includes: a support (32) that moves along a transport trajectory of the vessel (16); a nose (38) including a mandrel (40) capable of holding a neck (26) of the vessel (16), the nose (38) being fixed removably to a bottom axial end of the support (32); characterized in that the nose (38) includes an ejection plate (46) which is mounted to slide axially around the mandrel (40) between a cladding position towards which it is elastically returned and in which the mandrel (40) protrudes axially downwards and an uncladding position in which the mandrel (40) is axially retracted above a bottom face of the plate (46). A device for replacing such a gripping member is also described.

12 Claims, 12 Drawing Sheets

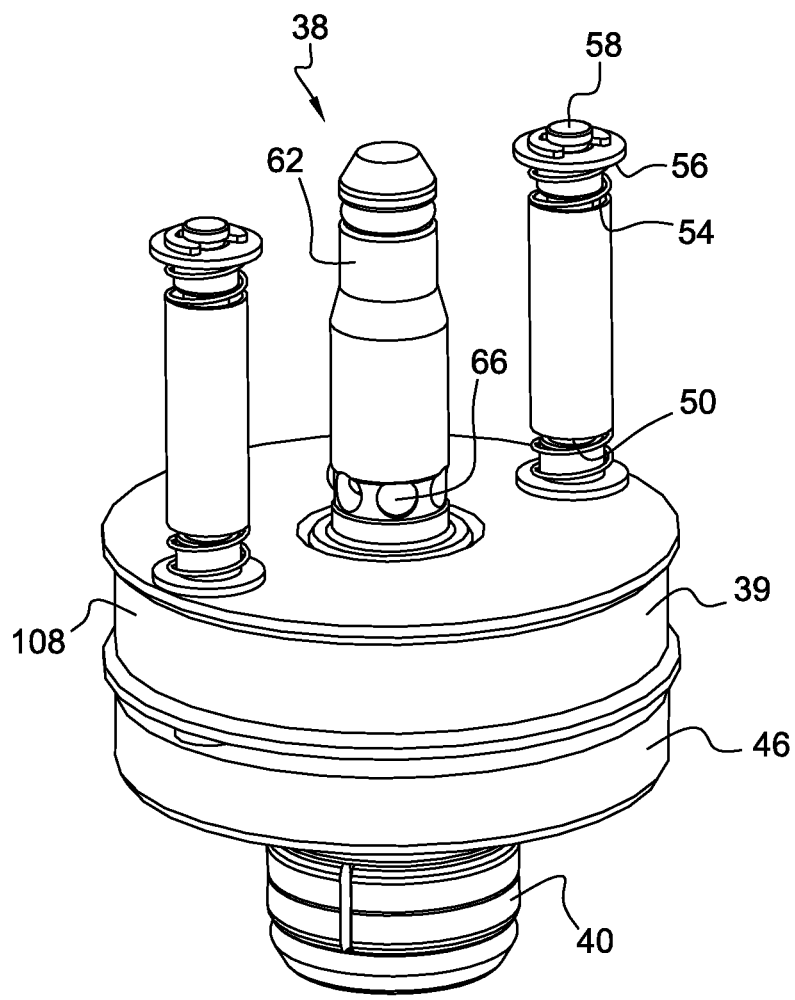
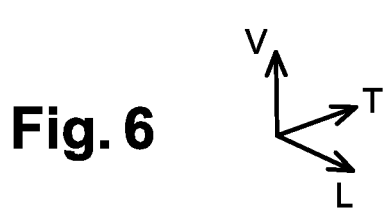

VESSEL GRIPPING MEMBER COMPRISING A REMOVABLE NOSE EQUIPPED WITH A MANDREL AND AN EJECTION PLATE

FIELD OF THE INVENTION

The invention relates to a vessel gripping member.

The invention relates more particularly to a vessel gripping member which comprises:
- a support that moves along a transport trajectory of the vessel;
- a nose comprising a mandrel capable of holding a neck of the vessel, the nose being fixed removably to a bottom axial end of the support.

The invention also relates to a device for replacing noses of such gripping members.

BACKGROUND OF THE INVENTION

Such gripping members are commonly used in vessel conveying installations, in particular for conveying thermoplastic preforms through an oven.

Such preforms are generally obtained by injection and have a tubular cylindrical body sealed at one of its axial ends, and which is prolonged at its other end by a neck, which is also tubular. The neck is generally injected in such a way as to already have its final form whereas the body of the preform is required to undergo a relatively great deformation to form the final vessel following a blowing operation.

The neck of the preform often has a bearing collar cooperating with a gripping clamp or with a guiding rail. The thinned edge at the open axial end of the neck is called the "rim" of the vessel. The axial distance between the end of the rim and the underside of the collar is generally a very precise distance because it is used for the sealing stopper of the vessel.

The operation involving blowing the body of the preform requires the latter to be raised to a temperature above the glass transition temperature of the material. The preform is subjected to a heat conditioning by having it circulate inside an oven. The oven comprises heating means which are, for example, formed by infrared lamps in which the preform is displaced by a conveying system.

The gripping members intended for conveying systems passing through an oven are not generally simple gripping clamps because the gripping member has to make it possible for the object to be driven in rotation about an axis.

At the end of travel, the mandrel has to be able to be withdrawn from the preform in order for the latter to be able to be transferred to a blowing station. Such an operation is known by the term "uncladding".

A number of solutions are known for uncladding a preform. One of them consists in arranging an ejection plate above each mandrel. The mandrel is capable of being axially retracted in a central orifice of the plate. The rim of the preform then abuts against the plate. The plate then prevents the axial sliding of the preform, which causes the mandrel to be removed from the neck of the preform.

Such a large series bottle manufacturing installation is very costly. One and the same installation therefore has to be able to be used to manufacture bottles of varying dimensions. The diameter of the preform necks is notably likely to vary depending on the model of bottle to be manufactured.

To enable necks of different formats to be held, it is known practice to change the mandrels on the conveying devices.

Furthermore, it is necessary to also change the ejection plates because the diameter of their central orifice is not suited to all the neck dimensions. A central orifice that is a little too big relative to the diameter of the neck can in fact cause the preform to topple.

However, the ejection plate and mandrel changing operations are a tedious operation which requires the installation to be stopped for a lengthy interval.

SUMMARY OF THE INVENTION

To resolve this problem in particular, the invention proposes a gripping member of the type described previously, characterized in that the nose comprises an ejection plate which is mounted to slide axially around the mandrel between a cladding position in which the mandrel protrudes axially downwards and an uncladding position in which the mandrel is axially retracted above a bottom face of the plate.

According to other features of the gripping member:
- the nose is fixed axially to the support by radial sliding of fixing elements between a fixing position and a release position, the nose comprising controlled means for locking the fixing elements in their fixing position;
- the locking means comprise a control element which is mounted to slide axially in the nose between a bottom position locking the fixing elements in the fixing position, towards which it is elastically returned, and an unlocking top position in which the nose is capable of being displaced axially relative to the support;
- the fixing elements are borne by the nose, the control element acting on a ramp which thrusts the fixing elements towards their fixing position when the control element is returned towards its locking position;
- the control element is a thrust rod which is arranged concentrically inside the mandrel such that a free bottom bearing end of the thrust rod is accessible through a concentric orifice opening under the mandrel;
- the ejection plate is returned elastically towards its cladding position;
- the ejection plate is controlled towards its uncladding position by abutment of a face of the plate against a face that slides axially relative to the support.

The invention also relates to a device for replacing the noses of such gripping members, characterized in that it comprises:
- a clamp comprising at least one moving jaw which is controlled between a closed position simultaneously clamping each nose and an open position simultaneously releasing each nose;
- actuation means comprising bearing pins that move simultaneously, each of which is associated with a nose and which are controlled between a simultaneous bearing position of the control elements of each nose and a simultaneous removed position in which the associated control elements are not stressed.

According to other features of the replacing device:
- the displacement of the bearing pins is linked to the movements of the moving jaw of the clamp in such a way that the bearing pins reach their bearing position only when the clamp is in its closed position;
- the movement of the moving jaw of the clamp is driven by the displacement of the bearing pins;
- the movements of the bearing pins and of the moving jaw are linked via a cam system;
- the replacing device is controlled manually;
- the replacing device is controlled automatically.

BRIEF DESCRIPTION OF THE DRAWINGS

Other features and advantages of the invention will become apparent while reading the following detailed description, for an understanding of which reference should be made to the appended drawings in which:

FIG. 6 is a perspective view which represents the nose of FIG. 3;

DETAILED DESCRIPTION OF THE DRAWINGS

Hereinafter in the description, the following orientations will be adopted in a nonlimiting manner:
- longitudinal indicated by the arrow "L" in the figures and oriented from back to front;
- vertical indicated by the arrow "V" in the figures and oriented upwards;
- transversal indicated by the arrow "T" in the figures and oriented from left to right.

The vertical direction is used as an arbitrary geometrical reference independent of the direction of gravity.

Hereinafter in the description, elements having identical structures or similar functions will be designated by the same reference numbers.

Figure 1:
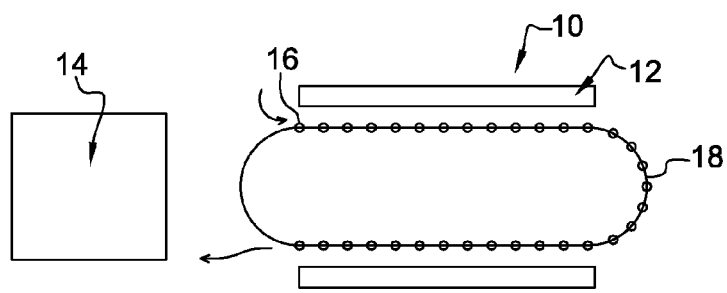
FIG. 1 is a plan view which schematically represents an installation for manufacturing vessels made of thermoplastic material.

FIG. 1 schematically represents an installation 10 for manufacturing vessels such as bottles made of thermoplastic material. Such an installation 10 comprises a heat conditioning oven 12 and a blowing or drawing-blowing station 14.

Vessels, which in this case are preforms 16, are intended to run through the conditioning oven 12 before being transferred one after the other to the blowing station 14. The preforms 16 are run through the oven 12 by means of a conveying line 18 forming a closed loop.

Figure 2:
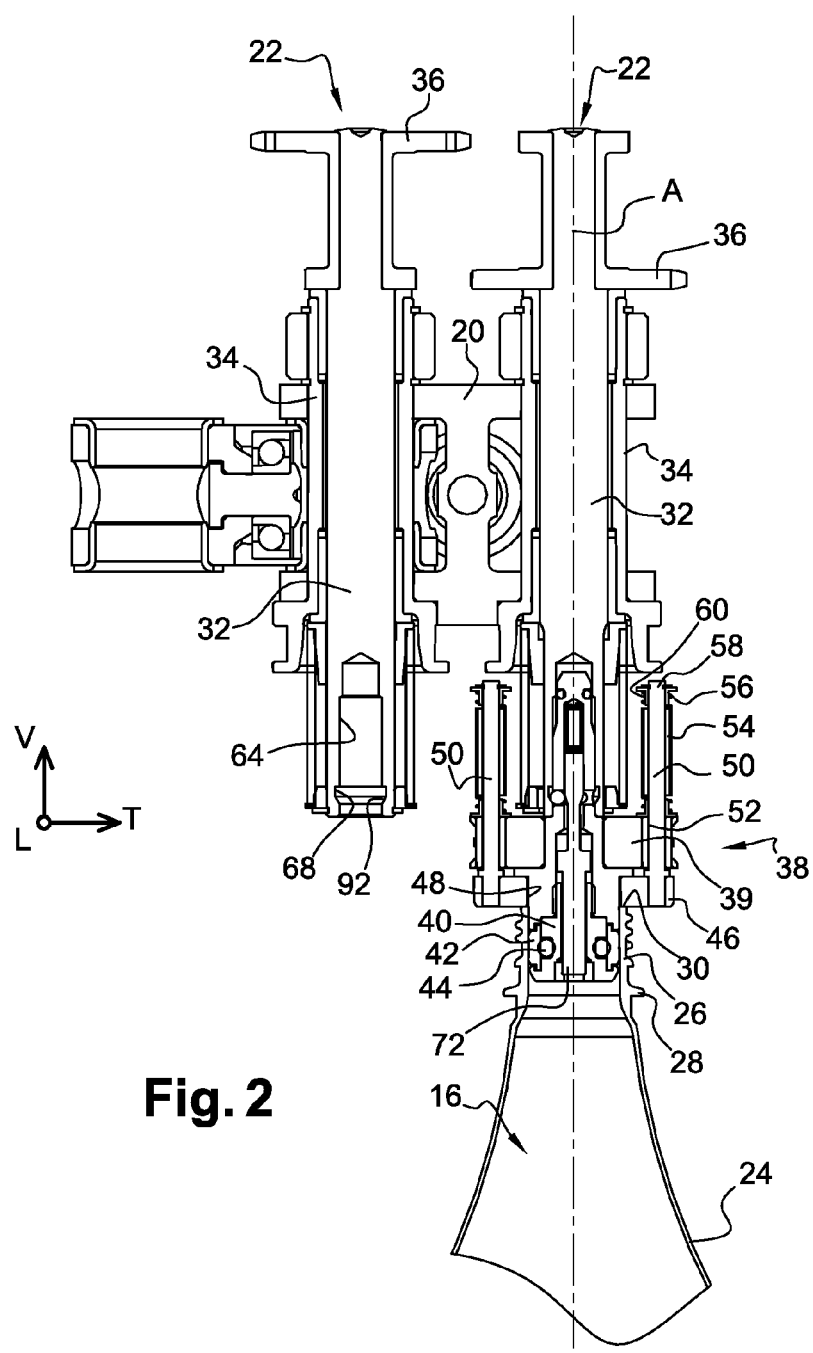
FIG. 2 is an axial cross-sectional view which represents a link of a preform conveying line which is equipped with two gripping members produced according to the teachings of the invention.

As represented in FIG. 2, the conveying line 18 is formed by the articulation of links 20. Each link 20 comprises at least one member 22 for gripping a preform 16. Each link 20 here bears two gripping members 22. The line 18 comprises numerous links 20 and numerous gripping members 22. Since all the gripping members 22 are substantially identical, just one of these gripping members 22 will be described hereinbelow.

A preform 16 comprises a body 24 which is open towards the top via a neck 26. The neck is delimited towards the bottom by a collar 28 and towards the top by a top end edge, called "rim 30".

The gripping member 22 makes it possible to hold a preform 16 by its neck 26. Furthermore, the gripping member 22 is capable of driving the preform 16 in rotation about its vertical axis "A" during its travel through the oven 12. This rotation makes it possible to ensure that the body of the preform 16 is uniformly heated.

The gripping member 22 represented in FIG. 2 comprises a support 32 which is formed by a shaft of vertical axis "A" which is mounted in rotation in a guiding bearing 34 of the link 20. The support 32 comprises, at its top end, a pinion 36 which is capable of cooperating with a rack (not represented) which is arranged along the trajectory of the link 20 to drive the support 32 in rotation.

The support 32 is here received so as to slide vertically in its bearing 34 between a bottom extreme position and a top extreme position.

The gripping member 22 also comprises a bottom nose 38 which is removably fixed to a bottom axial end of the support 32. The nose 38 is more particularly fixed relative to the support 32. In FIG. 2, the support 32 on the left is represented without its nose 38, whereas the support 32 on the right is represented equipped with its nose 38.

Figure 3:
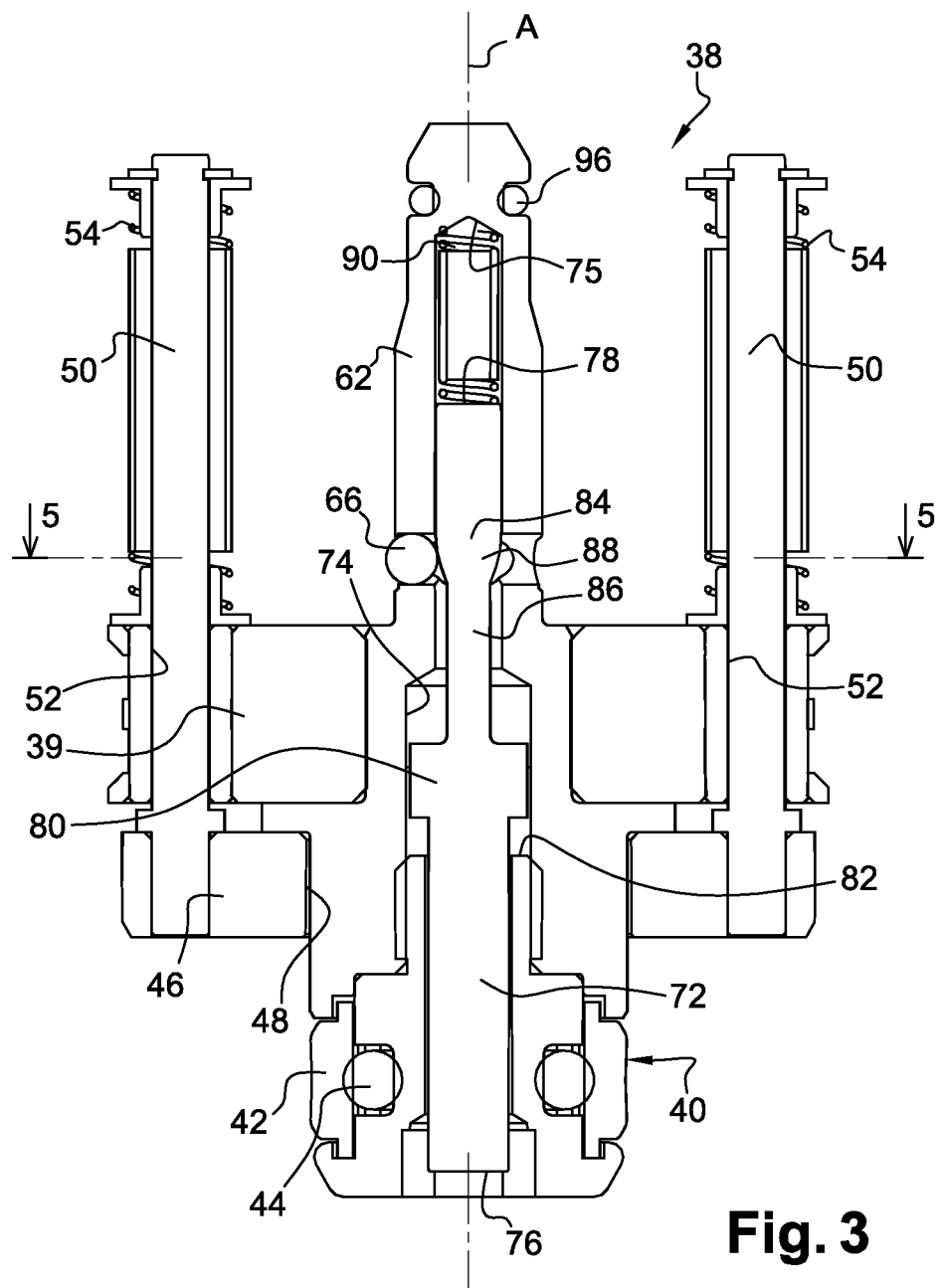
FIG. 3 is an axial cross-sectional view which represents a nose of the gripping member of FIG. 2.

The nose 38 is represented in more detail in FIG. 3. It comprises a cylindrical body 39 which comprises a bottom end mandrel 40 which is arranged coaxially to the axis "A" of rotation. The mandrel 40 can be inserted axially into the neck 26 of the vessel 16 to hold the vessel 16. The mandrel 40 is more particularly formed by at least three segments 42 which are arranged about the axis "A" of rotation. Each segment 42 is thrust radially outwards into an expanded position by a ring 44 made of an elastomer material. Thus, each segment 42 can be thrust radially against the internal cylindrical wall of the neck 26 in order to block the preform 16 by friction.

The nose 38 also comprises an ejection plate 46 which has a radial disc form. A central orifice 48 of the ejection plate 46 is intended to receive the mandrel 40. The ejection plate 46 is thus mounted to slide axially about the mandrel 40 between:
- a cladding position towards which it is returned elastically and in which the mandrel 40 protrudes axially downwards, as is illustrated by the nose 38 of FIG. 3 and by the two devices 22 situated on the left in FIG. 4; and
- an uncladding position in which the mandrel 40 is retracted axially above the ejection plate 46, as is illustrated by the two devices 22 situated on the right in FIG. 4.

Each ejection plate 46 comprises two columns 50 which extend vertically upwards from the top face of the plate 46. Each column 50 is fixed relative to the plate 46. The columns 50 are arranged diametrically opposed, radially on either side of the mandrel 40.

Each column 50 is received in such a way as to slide axially in an associated through orifice 52 of the body 39 of the nose 38 so that each column 50 protrudes vertically above a top face of the body 39.

An elastic return means 54, in this case a helical spring, is interposed between a shoulder bottom face 56 of the top end 58 of each column 50 and the top face of the body 39 of the nose 38. The elastic return means 54 thus makes it possible to elastically return the plate 46 to its cladding position.

Figure 4:
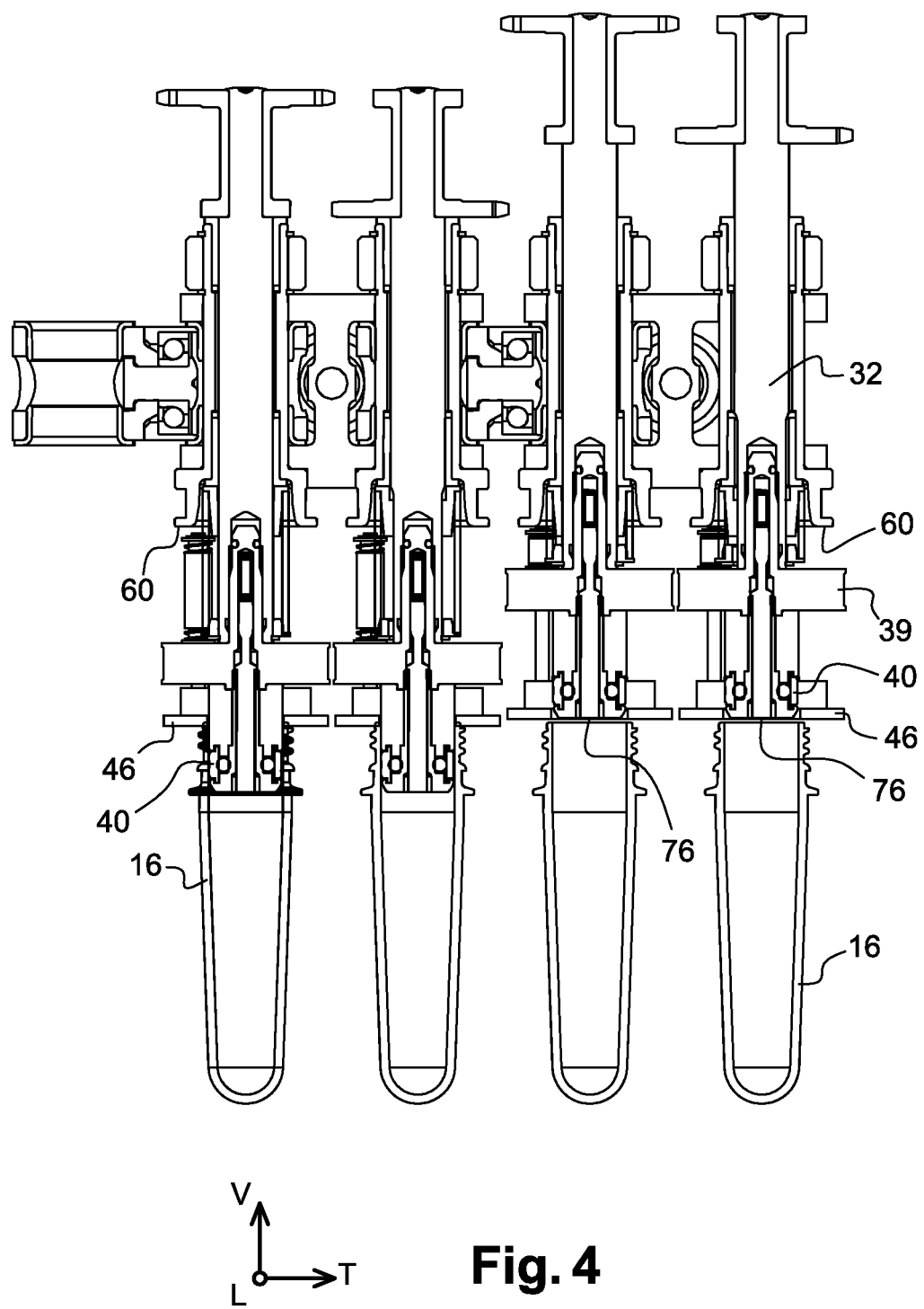
FIG. 4 is a view similar to that of FIG. 2 which represents two links each equipped with two gripping members, the two gripping members on the left comprising an ejection plate in the cladding position and the two gripping members on the right comprising an ejection plate in the uncladding position.

The top end of each column 50 is also capable of abutting against a bottom face 60 facing the link 20 when the support 32 is controlled towards its top extreme position as is illustrated in FIG. 4. Thus, the ejection plate 46 is retained by the abutment face 60 whereas the mandrel 40 is retracted into its uncladding position.

Figure 5:
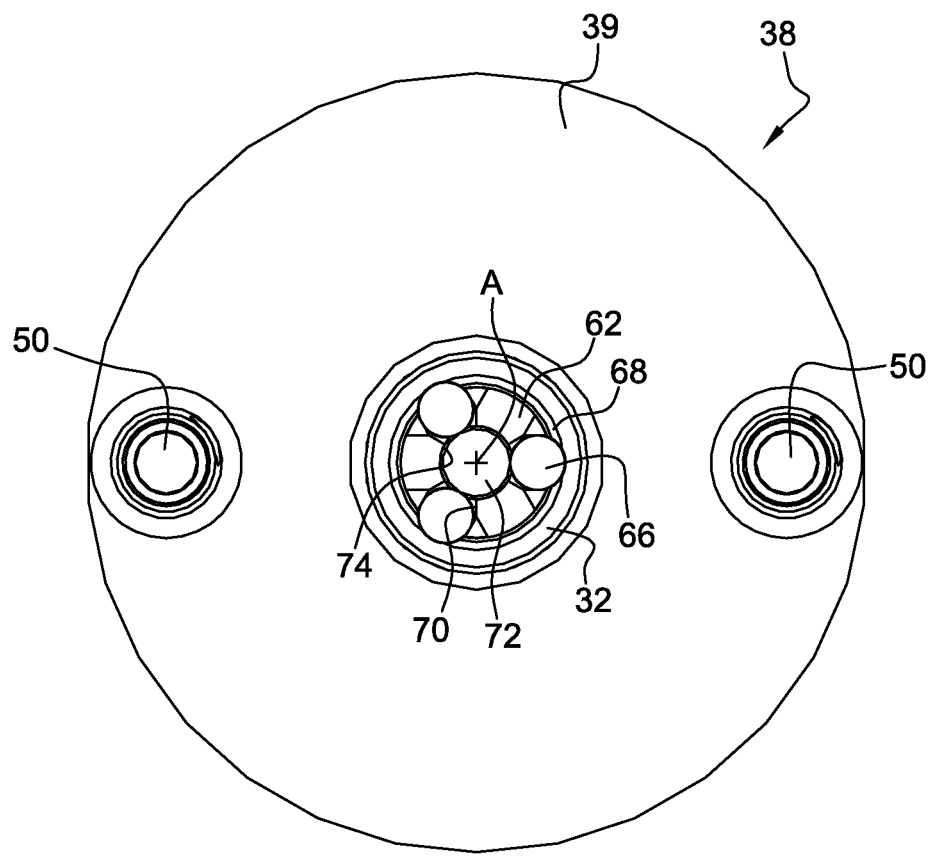
FIG. 5 is a cross-sectional view along the cutting plane 5-5 of FIG. 3 which represents the ball fixing means fixing the nose to the support.

Removable fixing means fixing the nose 38 onto the support 32 have been represented in more detail in FIGS. 3, 5 and 6. These means comprise a first fitting element for the nose 38 which is intended to be fitted axially with a second fitting element for the support 32.

The first fitting element is here a male spindle 62 which extends vertically up from the top face of the body 39 of the nose 38. The spindle 62 is fixed relative to the body 39. The spindle 62 is more specifically arranged coaxially to the axis "A" of rotation of the support 32.

As represented in FIG. 2, the second fitting element is formed by an orifice 64 of axis "A" opening at the bottom end of the support 32. The fitting orifice 64 has a form complementing that of the spindle 62.

The fixing means also comprise fixing elements 66 which are mounted to slide radially in the spindle 62. The fixing elements 66 are thus borne by the nose 38.

Each fixing element 66 can be received partially in a complementary cavity 68 which is formed in the internal wall of the fitting orifice 64. The cavity 68 is here formed by a groove.

The fixing elements 66 are here formed by balls, each of which is imprisoned in a recess 70 which is produced in the wall of the spindle 62. The recess 70 opens radially outwards so that each fixing element 66 can slide radially between
- a fixing position in which the fixing elements 66 are expanded radially, by protruding radially outwards so as to be received in the cavity 68 of the support 32;
- and a release position, in which the fixing elements 66 are retracted inside the spindle 62 to allow the nose 38 to slide axially relative to the support 32.

The nose 38 also comprises means for locking the fixing elements 66 in their fixing position. The locking means comprise a control element 72 which is mounted to slide axially in the nose 38. The control element 72 is more particularly formed by a thrust rod 72 of vertical axis which is arranged coaxially to the axis "A" of rotation.

To this end, the mandrel 40 and the body 39 comprise a concentric axial cylindrical orifice 74 opening towards the bottom and delimited towards the top by a top end plate 75. The end plate 75 is arranged axially above the fixing elements 66. The control element 72 thus forms a thrust rod which is arranged concentrically inside the mandrel 40.

The recesses 70 of the fixing elements 66 open radially in the central orifice 74. Thus, in their release position, the fixing elements 66 protrude radially towards the interior of the orifice 74 whereas, in the fixing position, the fixing elements 66 are flush with the internal cylindrical face of the central orifice 74, as is illustrated in FIGS. 3 and 5.

The thrust rod 72 comprises a free bottom first end 76 and a free top second end 78.

The thrust rod 72 also comprises a collar 80 which is intended to prevent the axial removal of the thrust rod 72 from the orifice 74. The collar 80 is intended to abut against a shoulder face 82 of the central orifice 74 which is oriented vertically upwards which is fixed relative to the body 39. The shoulder face 82 is arranged vertically below the fixing elements 66. In the example represented in the figures, the face 82 is arranged in the body 39.

The thrust rod 72 also comprises a section 84 for locking the fixing elements 66 in their fixing position, and a section 86 for releasing the fixing elements 66.

The locking section 84 has a diameter substantially equal to the diameter of the orifice 74 at the level of the fixing elements 66. Thus, the locking section 84 prevents the fixing elements 66 from sliding radially towards their retracted position.

The release section 86, on the other hand, has a diameter substantially less than the diameter of the orifice 74 at the level of the fixing elements 66 so that the fixing elements 66 can be retracted inside their recess 70.

The release section 86 is arranged axially below the locking section and above the collar 80.

A transition section 88 between the locking section 84 and the release section 86 has a tapered form so as to form a slope capable of thrusting the fixing elements 66 towards their fixing position when the thrust rod 72 slides downwards.

An elastic return means 90, here a helical spring, is interposed between the end plate 75 and the top end 78 of the thrust rod 72.

The thrust rod 72 is thus mounted to slide in the nose 38 between:
- a bottom position locking the fixing elements in the fixing position, towards which it is returned elastically by the elastic return means 90, and
- an unlocking top position in which the nose 38 can be displaced axially relative to the support 32.

The thrust rod 72 thus acts on the transition section 88 in the form of a ramp which radially thrusts the clamping elements 66 towards their fixing position when the thrust rod 72 is returned towards its locking position.

To facilitate the removal of the nose 38 from the support 32, the cavity 68 comprises, at its bottom end, a ramp 92 which is capable of causing the fixing elements 66 to slide towards their release position during the axial removal of the nose 38 relative to the support 32.

The thrust rod 72 is arranged in the mandrel 40 in such a way that its free bottom bearing end 76 is accessible through the concentric orifice 74 opening under the mandrel 40. It is thus possible to stress the bottom end 76 of the thrust rod 72 vertically upwards to cause the thrust rod 72 to slide towards its unlocking position.

The bearing end 76 of the thrust rod 72 is arranged so as not to protrude axially downward relative to the bottom face of the mandrel 40 when the thrust rod 72 is in its locking position. This makes it possible in particular to avoid having the nose 38 unlocked accidentally, for example when the bottom face of the mandrel 40 abuts against the rim 30 of the preform 16 in the event of a malfunction.

The bottom end of the concentric orifice 74 of the mandrel 40 has a diameter greater than that of the thrust rod 72. This makes it possible to facilitate the insertion of an unlocking pin 94, as will be explained in more detail hereinbelow.

The top end of the spindle 62 also comprises means for securely attaching the nose 38 in rotation about the axis "A" with the support 32.

In the embodiment represented in FIG. 3, the spindle 62 comprises a ring 96 made of elastomer material which is intended to be pinched radially between the spindle 62 and the internal cylindrical wall of the fitting orifice 64. This makes it possible to drive the nose 38 in rotation by friction.

This ring 96 also makes it possible to radially chock the spindle 62 in the fitting orifice 64 so as to avoid toppling movements of the nose 38 relative to the support 32.

According to an embodiment of the invention that is not represented, the free top end of the spindle has a non-circular profile which is intended to cooperate with a top end section of complementary form of the fitting orifice to block the rotation of the spindle relative to the support.

When removing a nose 38, the bottom end 76 of the thrust rod 72 is stressed upwards against the elastic return force. The release section 86 is thus brought level with the fixing elements 66. The nose 38 is then pulled downwards so that the fixing elements 66 are thrust radially inwards towards their release position by contact with the ramp 92 of the cavity 68. A new nose 38 can then be mounted on the support 32.

The bottom end 76 of the thrust rod 72 is stressed upwards to cause the release section 86 to slide level with the fixing elements 66. The spindle 62 is then inserted vertically upwards into the fitting orifice 64, and the fixing elements 66 can be thrust towards the release position by contact with the bottom edge of the fitting orifice 64.

When the nose 38 is in abutment against the support 32, the thrust rod 72 is released so as to be returned elastically towards its locking position. The transition section 88 thrusts the fixing elements 66 towards their fixing position, then the locking section 84 blocks the fixing elements 66 in their fixing position.

The fixing elements 66 then cooperate with the cavity 68 to block the nose 38 in its mounted position.

Advantageously, the fixing elements 66 bear on the associated ramps 92 so as to press the nose 38 vertically upwards against the support 32.

The invention also provides a device 98 for replacing at least one nose 38 of the gripping member 22. Advantageously, to shorten the time it takes to replace the noses 38 of the gripping member 22, the replacing device 98 makes it possible to replace a plurality of noses 38 simultaneously, in this case ten noses 38.

Figure 7:
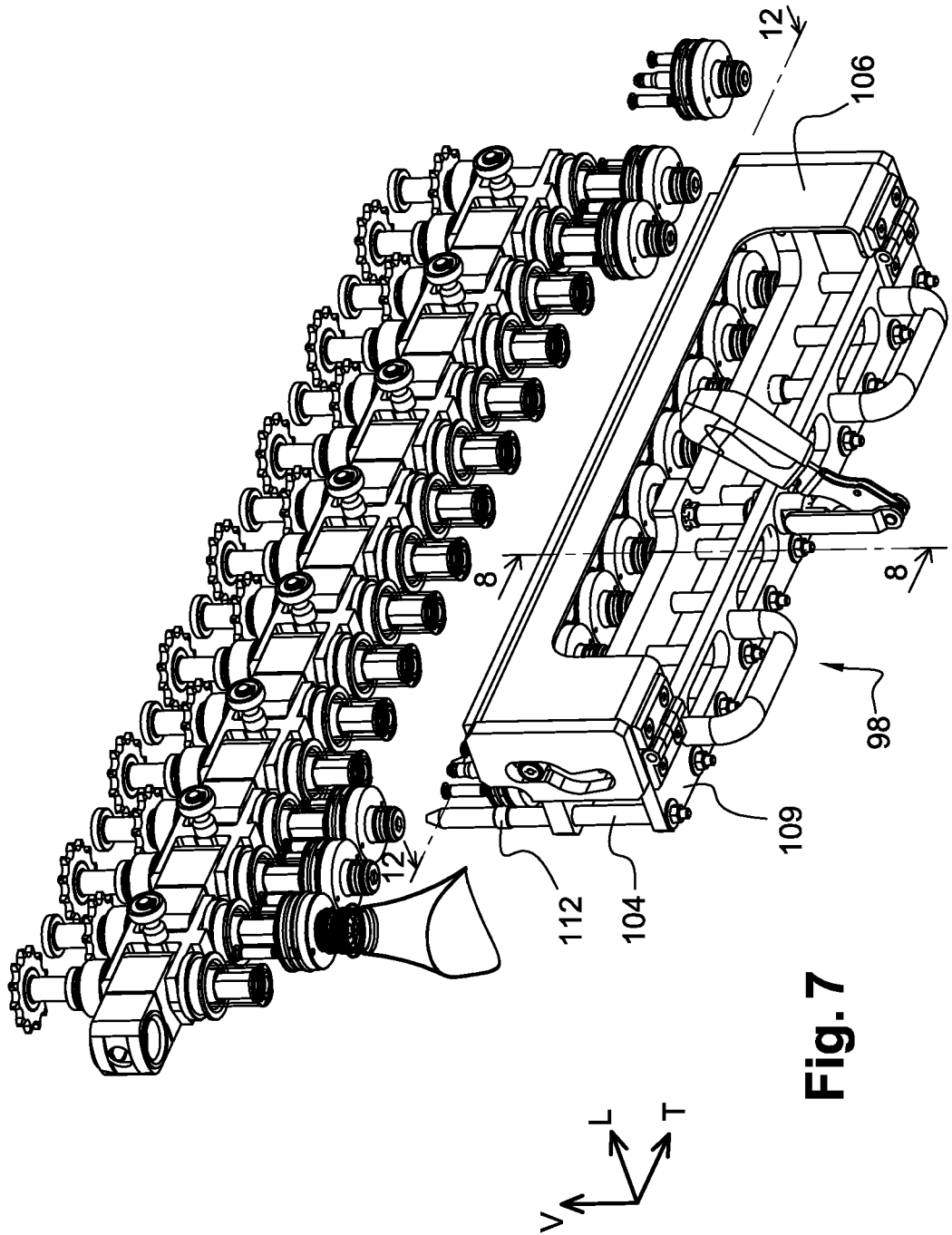
FIG. 7 is a perspective view which represents a device for replacing a plurality of noses simultaneously.

It will of course be understood that such a replacing device 98 can be adapted to the replacement of any number of noses 38 by simply modifying the device 98 presented as an example in FIG. 7 and the subsequent figures.

The gripping device 98 mainly comprises:
- a common clamp 100 for simultaneously holding the noses 38 which can be seen in particular in FIGS. 8 to 11;
- means 102 for actuating the thrust rods 72 of each nose 38 towards their release position which can be seen in particular in FIGS. 8, 9, 12 and 13.

The clamp 100 here comprises a fixed jaw 104 and a jaw 106 which moves longitudinally and which is controlled between a closed position simultaneously clamping each nose 38 and an open position simultaneously releasing each nose 38.

The clamp 100 is designed in such a way as to hold ten adjacent noses 38 aligned in a transversal straight line. Such a configuration is found along a straight line of the line 18.

To facilitate the gripping of the noses 38, each nose 38 here comprises a gripping area 108 which is formed in an external cylindrical wall of the body 39 of the nose 38. The gripping area 108 is formed by a concave curve of said cylindrical wall.

The fixed jaw 104 comprises a transversal casing 109 which is intended to be in line with the mandrels 40 of each nose 38. Eleven vertical fingers 110 extend from a top face of the casing 109 to a free top end 113. The fingers 110 are aligned transversally, with a longitudinal offset towards the rear relative to the plane defined by the axes "A" of each nose 38.

Each finger 110 is intended to be received between two supports 32 of adjacent noses 38. The fingers 110 are spaced apart by a transversal distance which is less than the diameter of the body 39 of the nose 38.

Each finger 110 comprises a central bulge 112 which has a form complementing that of the curve of the area 108 of the noses 38. Such a bulge 112 can notably be seen in FIG. 7. Thus, when the fixed jaw 104 is positioned to grip the noses 38, each nose 38 is in contact with two fingers 110 with an angle of approximately 120° relative to one another, as can be seen in particular in FIGS. 10 and 11.

The free end 113 of each finger 110 forms a reference face to facilitate the positioning of the replacing device 98 relative to the noses 38 by contact with a face that is fixed relative to the supports 32. In the example represented in the figures, this fixed face is formed by a bottom face of the links 20.

The moving jaw 106 is mounted to pivot on the casing 109 about a longitudinal pivoting axis "B" via a vertical arm 114. The jaw 106 has ten notches in the form of a circular arc, each of which has a form complementing the gripping area 108 of the associated nose 38. The moving jaw 106 is arranged in opposition with the fingers 110 relative to the noses 38.

Figure 10:
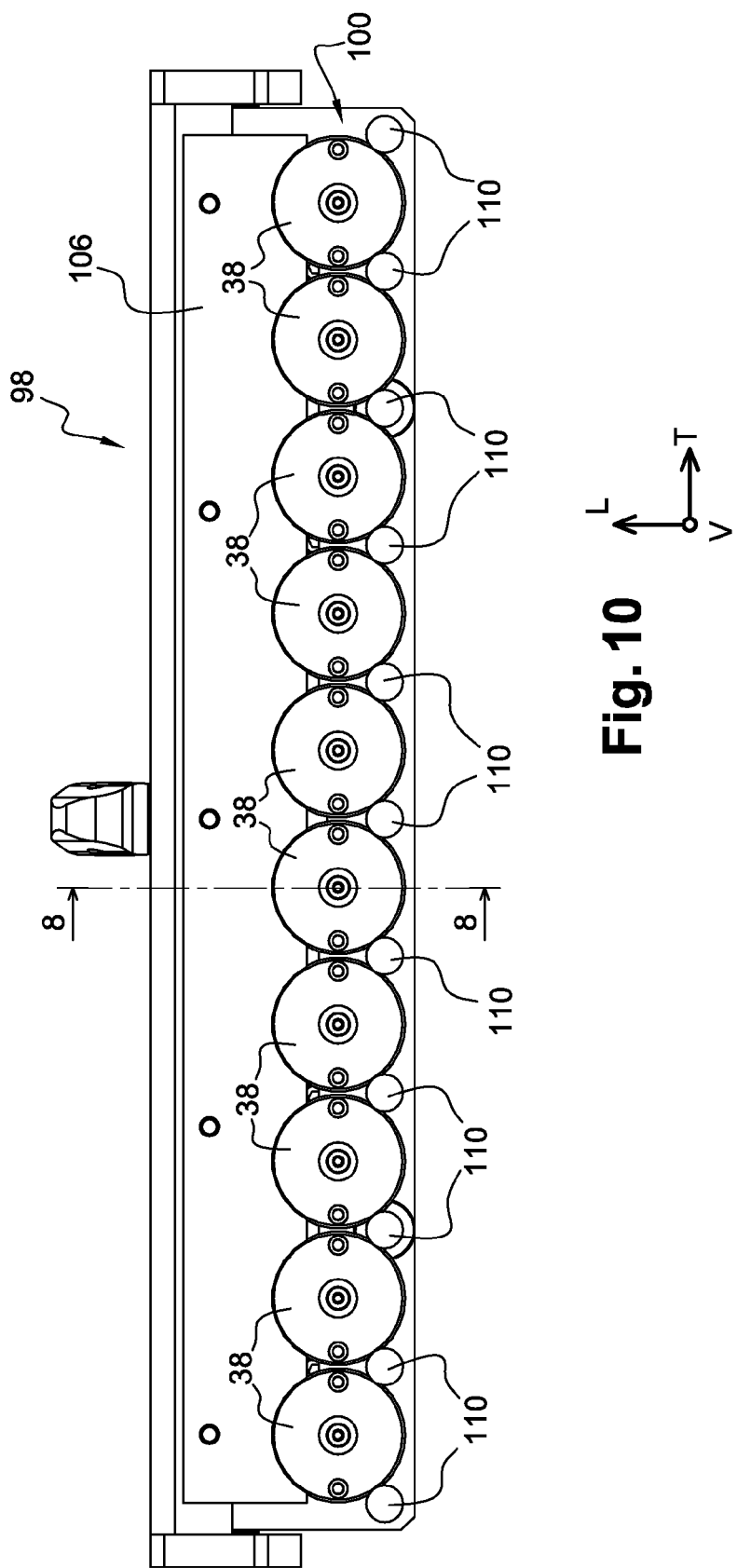
FIG. 10 is a cross-sectional view along the cutting plane 10-10 of FIG. 8 which represents a clamp of the replacing device in the open position.
Figure 11:
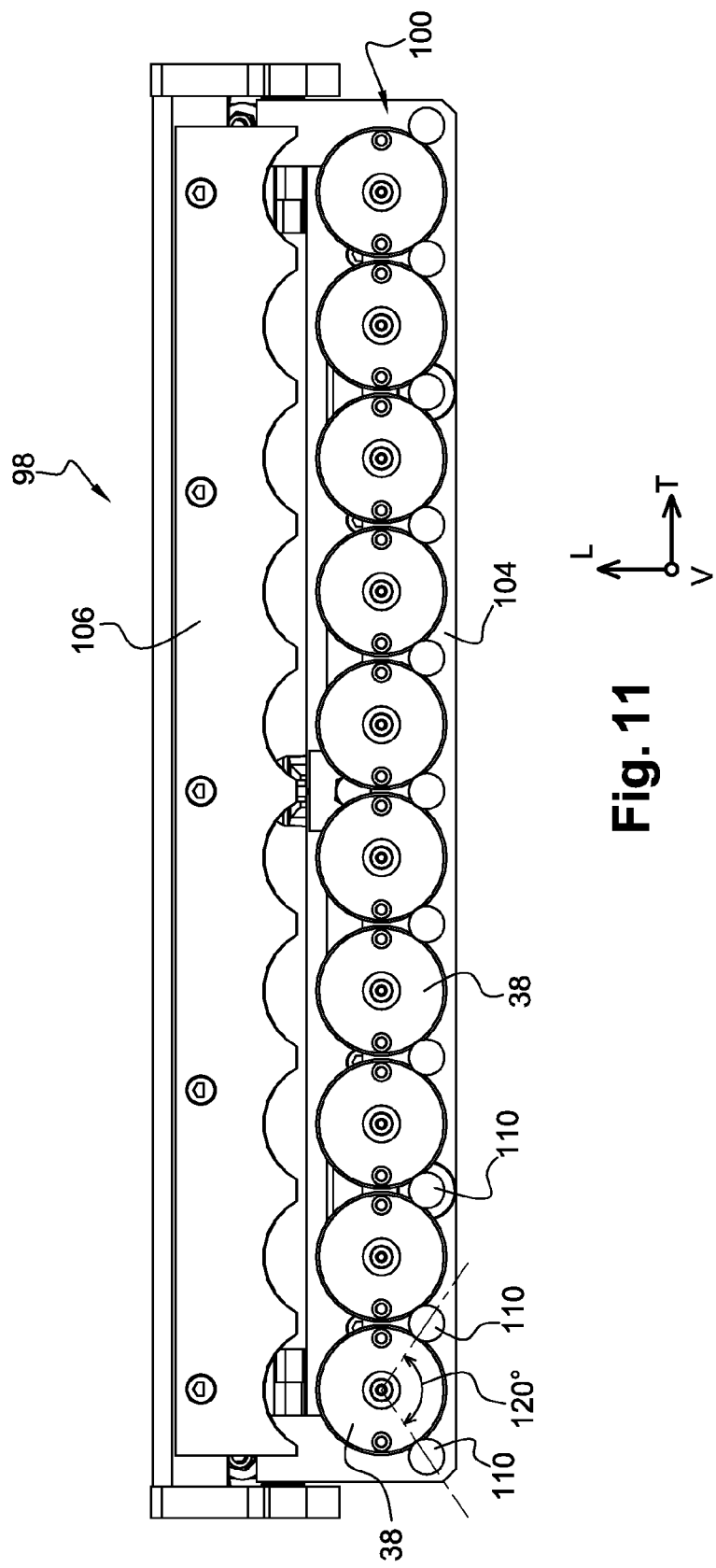
FIG. 11 is a view similar to that of FIG. 10 which represents the clamp in the closed position.

Thus, the moving jaw 106 can pivot between a closed position in which it longitudinally clamps the body 39 of the nose 38 against the fingers 110, as is represented in FIG. 10, and an open position in which it is longitudinally separated from the noses 38, as represented in FIG. 11.

The curved form of the gripping area 108 makes it possible to maintain the nose 38 vertical relative to the jaws 104, 106 in the closed position.

The actuation means 102 comprise ten bearing pins 94 which can move between a top simultaneous bearing position of the thrust rods 72 of each nose 38, and a bottom simultaneous removed position in which the thrust rod 72 is not stressed.

Figure 12:
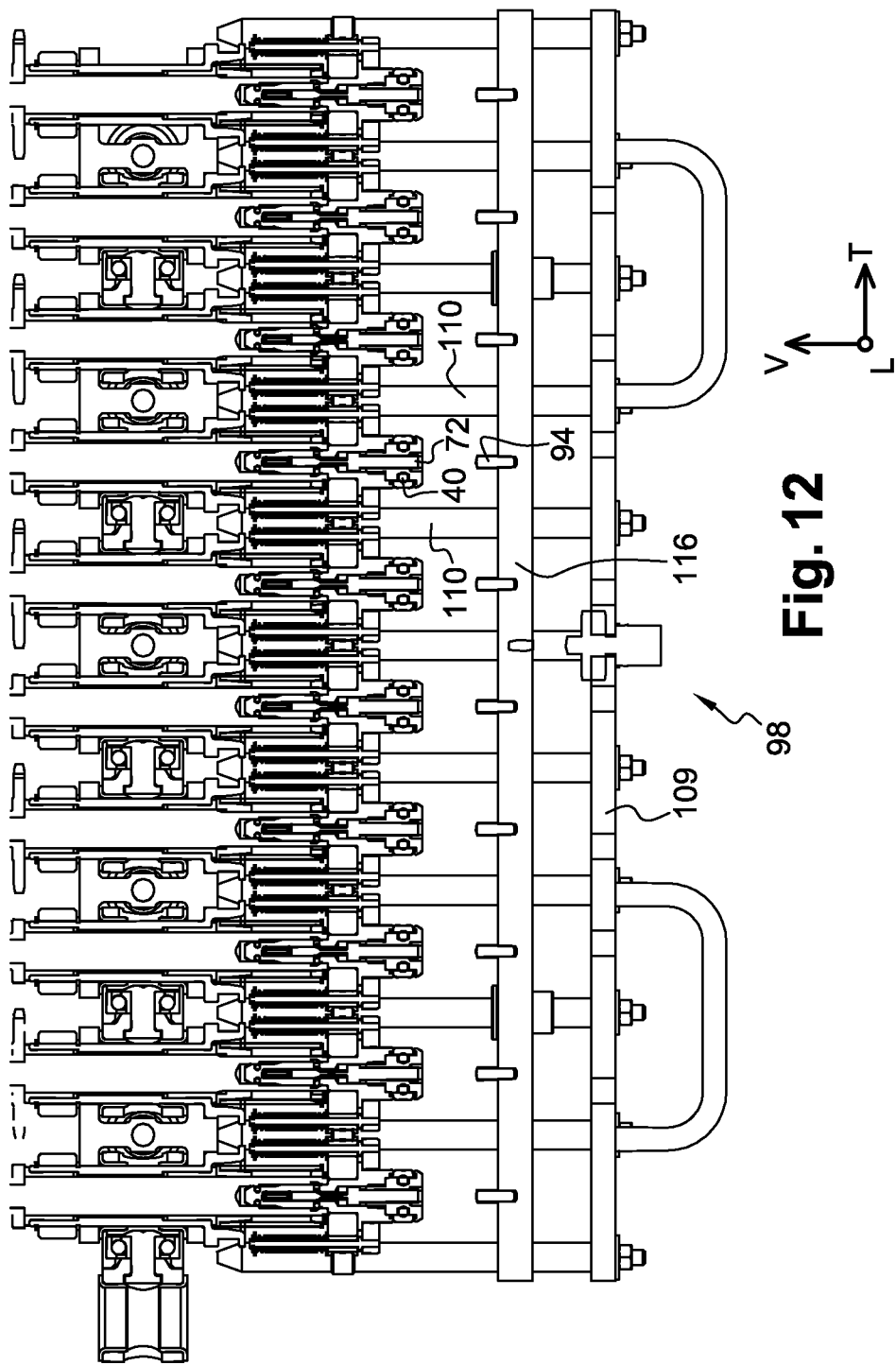
FIG. 12 is a transversal cross-sectional view along the cutting plane 12-12 of FIG. 7 which represents the bearing pins in the removed position.

For this, the pins 94 are fixed to a common cross member 116, as illustrated in FIG. 12. Each pin 94 extends vertically upwards from a top face of the cross member 116. The pins 94 are arranged in a transversal alignment, each coinciding with a bearing end 76 of the thrust rod 72 of the associated nose 38.

Figure 13:
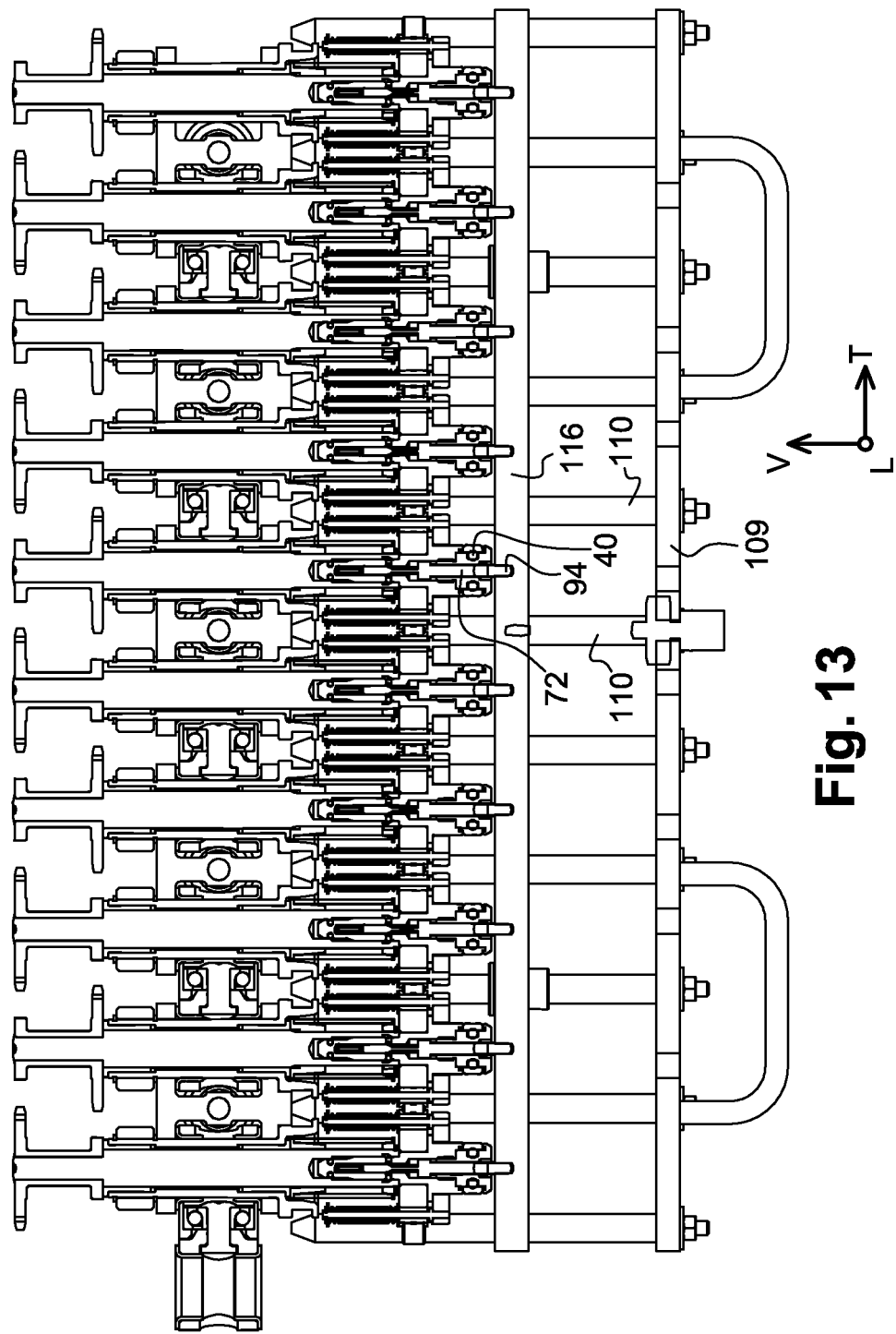
FIG. 13 is a view similar to that of FIG. 12 which represents the bearing pins in the bearing position.

The cross member 116 is mounted to slide relative to the casing 109 between the bottom removed position of the pins 94, as illustrated in FIG. 12, and the top bearing position of the pins 94, as illustrated in FIG. 13. The cross member 116 is guided while sliding by a bottom section of the fingers 110. To this end, the cross member comprises through orifices for the fingers 110.

The displacement of the cross member 116 is linked to the movements of the moving jaw 106 in such a way that the pins 94 reach their bearing position only when the moving jaw 106 is in its closed position.

In the example represented in the figures, the movement of the moving jaw 106 of the clamp 100 is driven by the sliding of the bearing pins 94. To this end, the movements of the bearing pins 94 and of the moving jaw 106 are linked via a cam system, as is illustrated in FIGS. 8 and 9.

The sliding of the cross member 106 is controlled by a lever 118 which is mounted to pivot about a transversal axis "C" on the casing 109 by one of its free ends. An intermediate portion of the lever 118 is linked to the cross member 116 via a link rod 120 so that the pivoting of the lever provokes the sliding of the cross member 116.

Figure 8:
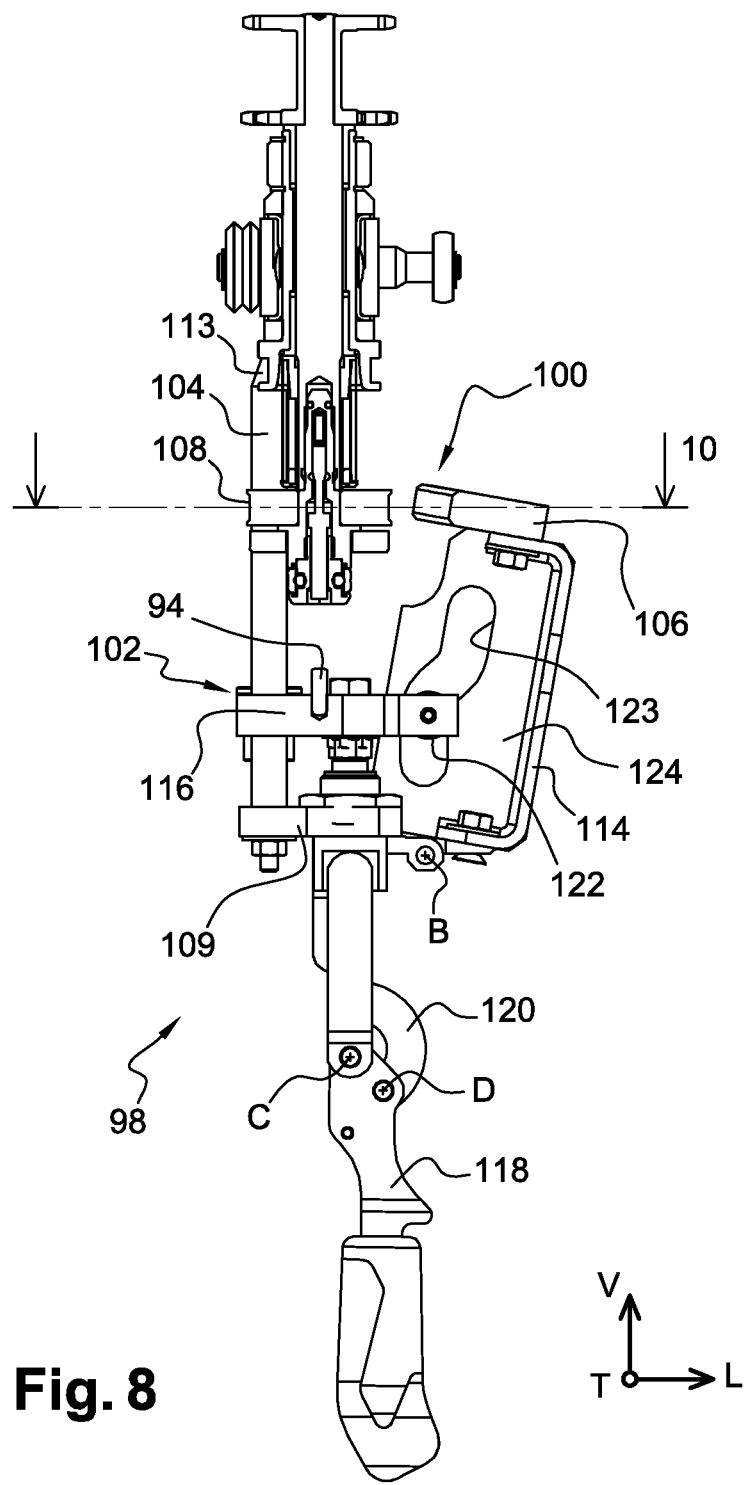
FIG. 8 is a cross-sectional view along the cutting plane 8-8 of FIG. 10 which represents the replacing device in an open position.
Figure 9:
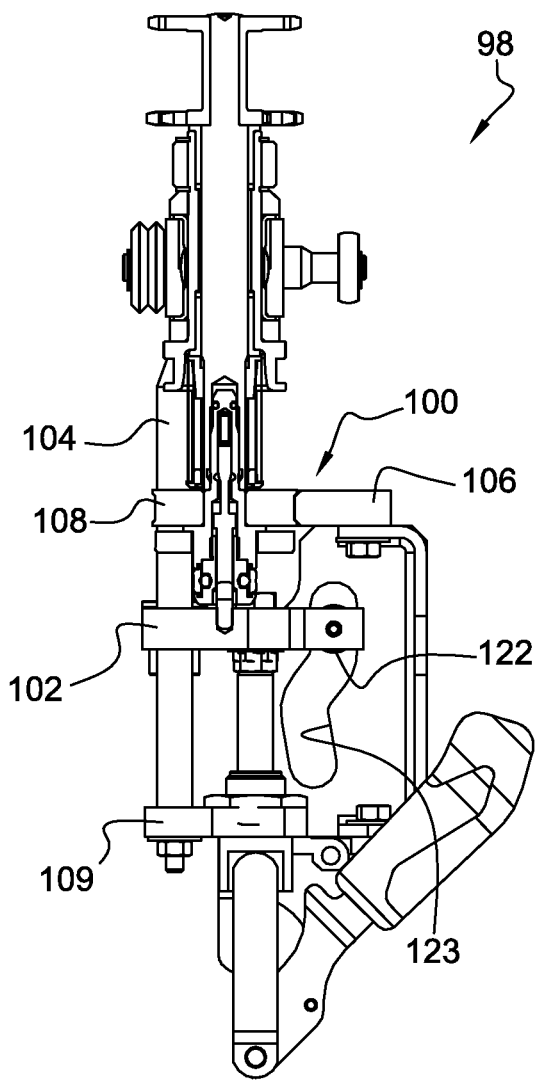
FIG. 9 is a view similar to that of FIG. 8 which represents the replacing device in a closed position.

The cross member 116 comprises, at each of its transversal ends, a cam 122 which is here formed by a rotary roller. Each cam 122 is received in an associated opening 123 which is produced in transversal end flanks 124 of the moving jaw 106. The opening 123 has a form such that:

the moving jaw 106 is controlled towards its closed position when the cross member 116 slides towards its bearing position, as represented in FIG. 9, and the moving jaw 106 is controlled towards its open position when the cross member 116 slides towards its removed position, as represented in FIG. 8.

Thus, the pins 94 release the noses 38 only when the noses 38 have actually been held by the clamp 100.

The gripping member 22 and the replacing device 98 produced according to the teachings of the invention thus guarantee a rapid replacement of the mandrel 40 and of the ejection plate 46 for each gripping member 22.

Furthermore, a replacing device 98 that is positioned and actuated manually has been described.

It will, however, be understood that the replacing device 98 can advantageously be automated. In this case, the device 98 is borne and positioned by a robotized arm (not represented). The actuation of the lever 118 is then advantageously motor-driven.

The invention claimed is:

1. A member (22) for gripping vessels (16), comprising:
   a support (32) that is movable along a transport trajectory of the vessel (16); and
   a nose (38) comprising a body (39) which is comprised of a bottom end mandrel (40) capable of holding in a neck (26) of the vessel (16), the nose (38) being fixed removably to a bottom axial end of the support (32),
   wherein the nose (38) further comprises an ejection plate (46) which is slidably fixed on the body (39), such that the ejection plate (46) is capable of an axial sliding around the mandrel (40) between a cladding position in which the mandrel (40) protrudes axially downwards and an uncladding position in which the mandrel (40) is axially retracted above a bottom face of the plate (46), and
   wherein the axial sliding of the ejection plate (46) with respect to the body (39) is limited, by abutment, to positions between said cladding position and said uncladding position, regardless of whether the nose is fixed to the bottom axial end of the support or if the nose is removed from the support.

2. A member (22) according to claim 1, wherein the ejection plate (46) is returned elastically towards the cladding position.

3. The member (22) according to claim 1, wherein the ejection plate (46) is controlled towards the uncladding position by abutment of a face (50) of the plate (46) against a face (60) that slides axially relative to the support (32).

4. A device (98) for replacing at least two noses (38) of a gripping member (22) according to claim 1, comprising:
   a clamp (100) comprising at least one moving jaw (106) which is controlled between a closed position simultaneously clamping each nose (38) and an open position simultaneously releasing each nose (38); and
   actuation means (102) comprising bearing pins (94) that move simultaneously, each of which is associated with a nose (38) and which are controlled between a simultaneous bearing position of the control elements (72) of each nose (38) and a simultaneous removed position in which the associated control elements (72) are not stressed.

5. The device (98) according to claim 4, wherein the displacement of the bearing pins (94) is linked to the movements of the moving jaw (106) of the clamp (100) in such a way that the bearing pins (94) reach said bearing position only when the clamp (100) is in the closed position.

6. The device (98) according to claim 5, wherein the movement of the moving jaw (106) of the clamp is driven by the displacement of the bearing pins (94).

7. The device (98) according to claim 6, wherein the movements of the bearing pins (94) and of the moving jaw (106) are linked via a cam system (122, 123).

8. The device (98) according to claim 4, wherein the device is controlled manually.

9. A member (22) for gripping vessels (16), comprising:
   a support (32) that moves along a transport trajectory of the vessel (16); and
   a nose (38) comprising a mandrel (40) capable of holding in a neck (26) of the vessel (16), the nose (38) being fixed removably to a bottom axial end of the support (32),
   wherein the nose (38) comprises an ejection plate (46) which is mounted to slide axially around the mandrel (40) between a cladding position in which the mandrel (40) protrudes axially downwards and an uncladding position in which the mandrel (40) is axially retracted above a bottom face of the plate (46), and
   wherein the nose (38) is fixed axially to the support (32) by radial sliding of fixing elements (66) between a fixing position and a release position, the nose (38) comprising controlled means for locking the fixing elements (66) in said fixing position.

10. The member (22) according to claim 9, wherein the locking means comprise a control element (72) which is mounted to slide axially in the nose (38) between a bottom position locking the fixing elements (66) in the fixing position, towards which the control element (72) is elastically returned, and an unlocking top position in which the nose (38) is capable of being displaced axially relative to the support (32).

11. The member (22) according to claim 10, wherein the fixing elements (66) are borne by the nose (38), and in that the control element (72) acts by way of a ramp (88) to thrust the fixing elements (66) towards said fixing position when the control element (72) is returned towards the locking position.

12. The member (22) according to claim 11, wherein the control element (72) is a thrust rod (72) which is arranged concentrically inside the mandrel (40) such that a free bottom bearing end (76) of the thrust rod (72) is accessible through a concentric orifice (74) opening under the mandrel (40).

* * * * *